G. W. MORSE.
Cartridge.
No. 20,727.
Patented June 29, 1858.
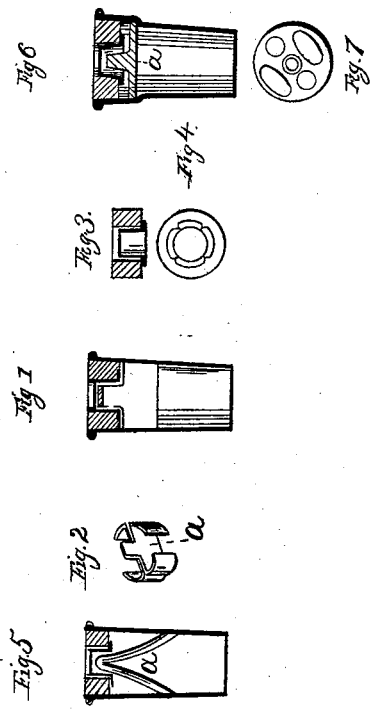

UNITED STATES PATENT OFFICE.

GEORGE W. MORSE, OF BATON ROUGE, LOUISIANA.

IMPROVEMENT IN CARTRIDGES.

Specification forming part of Letters Patent No. 20,727, dated June 29, 1858.

*To all whom it may concern:*

Be it known that I, GEORGE W. MORSE, of Baton Rouge, in the State of Louisiana, have invented a new and Improved Mode of Manufacturing Cartridges for Breech-Loading Fire-Arms; and I do hereby declare that the following is a full and exact description thereof, reference being had to the accompanying drawings, and to the letters of reference marked thereon.

My invention relates to that class of cartridges for breech-loading fire-arms which has a metallic case, and which is inserted in the rear end of the barrel; and it consists in the mode or modes of providing the metallic case with a tige, secured in the interior of the same, as hereinafter described, and extending toward the rear of the cartridge, so as to serve as a means of exploding the percussion-cap when it is struck by the dog or hammer of the gun.

It also consists in the combination and arrangement of the percussion-cap, with a perforated disk of caoutchouc, or some other equivalent elastic material, as described, whereby the contents of the cartridge-case are well secured against moisture, the cap protected from accidental explosion during transportation, and the cartridge readily exploded by the hammer whenever it is desired to discharge the gun.

To enable others skilled in the art to make and use my invention, I will proceed to describe its construction and operation.

I construct my cartridge-case, in the usual manner, of brass, copper, tin, or any other suitable metal or alloy, open at both ends, and having a slight flange on the rear end, to facilitate the withdrawal of the cartridge from the barrel of the gun, as shown in section in Figures 1, 5, and 6. I then secure the tige in the case in one of the three different modifications of the same contrivance, as illustrated in Figs. 5, 1, and 6. In Fig. 5 the tige is formed of a strong wire, bent as shown in the figure, and soldered at the ends to the inner sides of the cartridge-case.

Fig. 2 represents the tige, as shown in Fig. 1, where it is also secured to the inner sides of the case by solder.

Fig. 7 represents a plan of the tige, which is shown in position, in section, in Fig. 6. The tige having been secured in the cartridge-case in either of the three modes above described, and illustrated in the drawings, I take the disk of caoutchouc, prepared as illustrated in Fig. 3, and carrying the percussion-cap, and insert it in the rear of the cartridge-case, pressing it firmly into its place until the inner portion of the percussion-cap shall reach, or nearly reach, the end of the tige. The cartridge-case is then ready to receive the powder and ball, which are inserted in the usual manner of loading cartridge-cases.

It will be observed that the percussion-cap does not extend entirely through the perforated disk, but that the body of the disk projects beyond it, thereby protecting the cap from accidental blows during transportation, and obviating one of the greatest objections to self-primed cartridges.

Having thus fully described and shown the character of my invention, I will now proceed to state what I claim as new, and for which I ask Letters Patent.

I claim—

1. The tige secured in the cartridge-case, in either of the modes above described, and all equivalents thereto, for the purpose above mentioned.

2. The combination and arrangement of the percussion-cap and perforated disk, as described, and for the purpose above mentioned, and any and all equivalents thereto.

In testimony whereof I have signed my name before two subscribing witnesses.

GEO. W. MORSE.

Witnesses:
N. CALLAN,
A. HERBERT.

UNITED STATES PATENT OFFICE.

GEO. W. MORSE, OF BATON ROUGE, LOUISIANA.

IMPROVEMENT IN CARTRIDGES.

Disclaimer forming part of Letters Patent No. 20,727, dated June 29, 1858.

Hon. M. D. LEGGETT,
 *Commissioner of Patents:*

Sir: In the matter of my application for extension of Letters Patent No. 20,727, dated June 29, 1858, in Cartridges, now pending, in view of the invention shown in the patent of M. Chaudron, Brevets d'Invention, vol. 46, N. S., page 41, pl. XII, dated March 9, 1855, I hereby disclaim so much of my invention as is set forth in the first clause of claim referring to three modes of securing the tige in the cartridge-case, reserving, however, all the rights and privileges to me belonging in the premises, and more especially all such claim or claims, invention or inventions, as to me shall appear to belong or to have belonged, in view of the reference above named, upon a reissue of said Letters Patent hereafter to be applied for; and this disclaimer is hereby expressly limited and restricted to the extent above named.

Washington, June 29, 1872.

GEO. W. MORSE.

Witnesses:
 THOS. HOUGHTON,
 T. C. SMITH.